(12) United States Patent (10) Patent No.: US 9,652,994 B1
Feng (45) Date of Patent: May 16, 2017

(54) PIANO LEARNING GUIDANCE SYSTEM

(71) Applicant: Shan Feng, Guangdong (CN)

(72) Inventor: Shan Feng, Guangdong (CN)

( * ) Notice: Subject to any disclaimer, the term of this patent is extended or adjusted under 35 U.S.C. 154(b) by 0 days.

(21) Appl. No.: 15/398,736

(22) Filed: Jan. 5, 2017

(30) Foreign Application Priority Data

Aug. 30, 2016 (CN) .......................... 2016 1 0772256

(51) Int. Cl.
*G09B 15/00* (2006.01)
*G09B 15/02* (2006.01)
*G09B 15/04* (2006.01)
*G10H 1/00* (2006.01)

(52) U.S. Cl.
CPC ............ *G09B 15/023* (2013.01); *G09B 15/00* (2013.01); *G09B 15/003* (2013.01); *G09B 15/04* (2013.01); *G10H 1/00* (2013.01); *G10H 1/0008* (2013.01); *G10H 2220/015* (2013.01); *G10H 2220/061* (2013.01); *G10H 2240/165* (2013.01); *G10H 2240/311* (2013.01)

(58) Field of Classification Search
CPC ......... G10G 1/00; G09B 15/00; G09B 15/003
USPC ................................................ 84/478, 479 A
See application file for complete search history.

(56) References Cited

U.S. PATENT DOCUMENTS

| 4,651,612 | A | * | 3/1987 | Matsumoto | ............ G09B 15/08 84/470 R |
| 5,275,082 | A | * | 1/1994 | Kestner-Clifton | ....... G10G 7/00 84/464 R |
| 5,394,784 | A | * | 3/1995 | Pierce | .................. G09B 15/003 84/464 A |
| 5,864,078 | A | * | 1/1999 | Koevering | ............... G10C 3/12 84/477 R |
| 5,886,273 | A | * | 3/1999 | Haruyama | ............. G09B 15/08 84/478 |
| 5,907,115 | A | * | 5/1999 | Matsunaga | .......... G09B 15/003 84/464 A |
| 6,084,167 | A | * | 7/2000 | Akimoto | ................... G10C 3/00 84/477 R |
| 6,133,518 | A | * | 10/2000 | Kamimura | ........... G10H 1/0016 84/423 R |
| 6,218,602 | B1 | * | 4/2001 | Davis | .................... G09B 15/023 84/477 R |
| 6,337,433 | B1 | * | 1/2002 | Nishimoto | ............... A63J 17/00 84/464 A |

(Continued)

FOREIGN PATENT DOCUMENTS

CN 203786941 U 8/2014

*Primary Examiner* — David Warren

(57) ABSTRACT

Disclosed is a piano learning guidance system, comprising a piano and two hand drums, wherein the piano comprises a control module, a storage module, a first LCD display screen, a second LCD display screen, a third LCD display screen, a key recording microphone and a plurality of first LED light bars in one-to-one correspondence to keys of the piano, and each first LED light bar is formed by a plurality of first LEDs; the storage module, the first LCD display screen, the second LCD display screen, the third LCD display screen and the key recording microphone are all electrically connected to the control module; the hand drum comprises a second LED light bar and a pressure sensor, and the second LED light bar is formed by a plurality of second LEDs; and the second LED light bar and the pressure sensor are electrically connected to the control module.

8 Claims, 3 Drawing Sheets

(56) References Cited

U.S. PATENT DOCUMENTS

| | | | | |
|---|---|---|---|---|
| 6,407,324 B1 * | 6/2002 | Hulcher | G09B 15/08 | 84/478 |
| 6,915,488 B2 * | 7/2005 | Omori | G10H 1/0008 | 434/227 |
| 7,629,527 B2 * | 12/2009 | Hiner | G09B 15/02 | 84/470 R |
| 8,642,871 B2 * | 2/2014 | Feidner | G09B 15/02 | 463/23 |
| 8,901,405 B1 * | 12/2014 | McCarthy | G09B 15/003 | 84/423 R |
| 2001/0025558 A1 * | 10/2001 | Ishida | G09B 15/023 | 84/478 |
| 2002/0017187 A1 * | 2/2002 | Takahashi | G09B 15/023 | 84/478 |
| 2002/0134216 A1 * | 9/2002 | Shibukawa | G09B 15/026 | 84/477 R |
| 2005/0005761 A1 * | 1/2005 | Knudsen | G09B 15/08 | 84/645 |
| 2005/0126365 A1 * | 6/2005 | Shaffer | G09B 15/003 | 84/314 R |
| 2005/0241459 A1 * | 11/2005 | Risley | G09B 15/00 | 84/464 A |
| 2006/0219091 A1 * | 10/2006 | Ohmura | G10H 1/0008 | 84/626 |
| 2010/0307319 A1 * | 12/2010 | Kani | G10G 1/02 | 84/485 R |
| 2013/0319208 A1 * | 12/2013 | Forrest | G09B 15/002 | 84/478 |
| 2014/0251114 A1 * | 9/2014 | Yoshikawa | G09B 15/08 | 84/478 |
| 2014/0260905 A1 * | 9/2014 | Lillard | G09B 15/00 | 84/484 |
| 2014/0260908 A1 * | 9/2014 | Yoshikawa | G10H 1/00 | 84/609 |
| 2016/0019810 A1 * | 1/2016 | Rodriguez | G09B 15/009 | 84/478 |

* cited by examiner

PIANO LEARNING GUIDANCE SYSTEM

CROSS REFERENCE TO RELATED APPLICATIONS

The present application claims the benefit of Chinese Patent Application No. 201610772256.3 filed on Aug. 30, 2016. All the above are hereby incorporated by reference.

TECHNICAL FIELD

The present invention relates to musical instrument teaching assistance devices, in particular to a piano learning guidance system.

BACKGROUND ART

When an electronic drum or a real drum is used, it is necessary to be acquainted with music scores and to consider beats when beating. A long-term training is required to beat fluently. A beginner is often not familiar with the music scores, cannot control the rhythm, and may not be corrected timely when a mistake is made, resulting in a boring beating process and difficulties in experiencing the pleasure of creating beautiful music by beating.

The Chinese utility model of the application no. 201420112807.X is a product which is researched and developed by the applicant, and can instruct a user to beat a drum. However, the electronic drum provided by that utility model is an independent product, and no teaching effect can be achieved by combining the drum with other musical instruments.

SUMMARY OF THE INVENTION

In order to overcome the defects in the prior art, the purpose of the present invention is to provide a piano learning guidance system, which can instruct a beginner to master the rhythm and play music even when he/she is not familiar with music scores.

The present invention is realized by means of the following technical solution: a piano learning guidance system, comprising a piano and two hand drums, wherein said piano comprises a control module, a storage module, a first LCD display screen, a second LCD display screen, a third LCD display screen, a key recording microphone and a plurality of first LED light bars in one-to-one correspondence to keys of the piano, and each first LED light bar is formed by a plurality of first LEDs which are successively arranged at equal intervals from top to bottom; the first LED light bar is used to instruct a user to press the corresponding key; the storage module, the first LED light bar, the first LCD display screen, the second LCD display screen, the third LCD display screen and the key recording microphone are all electrically connected to the control module; the key recording microphone is used to collect piano audio when the user presses the key;

each hand drum comprises a second LED light bar and a pressure sensor, the second LED light bar is formed by a plurality of second LEDs which are successively arranged at equal intervals from top to bottom, and the second LED light bar is used to instruct the user to beat the hand drum; the pressure sensor is used to collect hand drum audio when the user beats the hand drum; the second LED light bar and the pressure sensor are electrically connected to the control module; the control module is used to read a MIDI file in the storage module, generate two dropping dot indication files or one dropping dot indication file and one music notation indication file or two music notation indication files by parsing the MIDI file, control lit positions of the first LEDs and the second LEDs from top to bottom according to the dropping dot indication file, control the first LCD display screen and/or the third LCD display screen to display the corresponding music notation according to the music notation indication file so as to instruct the user to press the key or beat the hand drum, and compare respectively the hand drum audio received from two pressure sensors with the MIDI file, or the piano audio received from the piano recording microphone with the MIDI file.

Preferably, 16 first LEDs are provided.

Preferably, said storage module is an SD card.

Preferably, a loudspeaker is further provided, the loudspeaker is electrically connected to the control module, and the control module is used to process and then output the hand drum audio from the pressure sensor or the read MIDI file in the storage module to the loudspeaker for play.

Preferably, said hand drum comprises two beat portions, two second LED light bars are provided and are in one-to-one correspondence to the beat portions, the second LED light bar is used to instruct the user to beat the hand drum at the corresponding beat portion; and said control module is used to control lit positions of the second LEDs of one of the second LED light bars from top to bottom according to one of the dropping dot indication files, and control lit positions of the second LEDs of the other second LED light bar from top to bottom according to the other dropping dot indication file.

Preferably, said piano further comprises a fallboard, said first LCD display screen, said second LCD display screen and said third LCD display screen are all arranged on the fallboard, and the end of the fallboard which is away from the keys when the fallboard is opened is provided with a ridge which is perpendicular to the first LCD display screen, the second LCD display screen and the third LCD display screen, respectively, the ridge is provided with laser transmitters in one-to-one correspondence to the keys, the laser transmitters are connected to the control module, and said control module is used to control the working of the corresponding laser transmitter according to the MIDI file so as to instruct the user to press the key corresponding to the laser transmitter.

Compared to the prior art, the beneficial effects of the present invention lie in that:

The present invention can help a piano beginner improve the sense of rhythm, and playing according to instructions of the LEDs enables a trainee to feel easy and more interested in learning and strengthens interactions.

DETAILED DESCRIPTION

Figure 1:
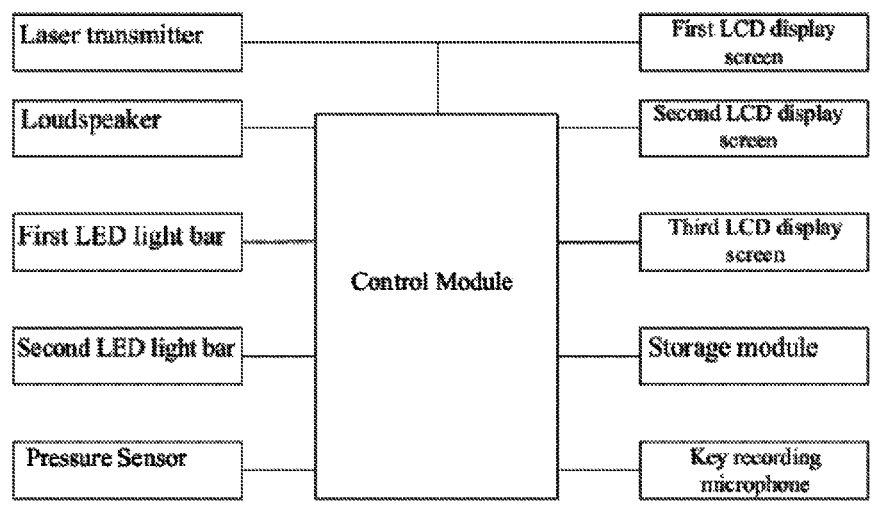
FIG. 1 is a structural view of a piano learning guidance system of the present invention.
Figure 2:
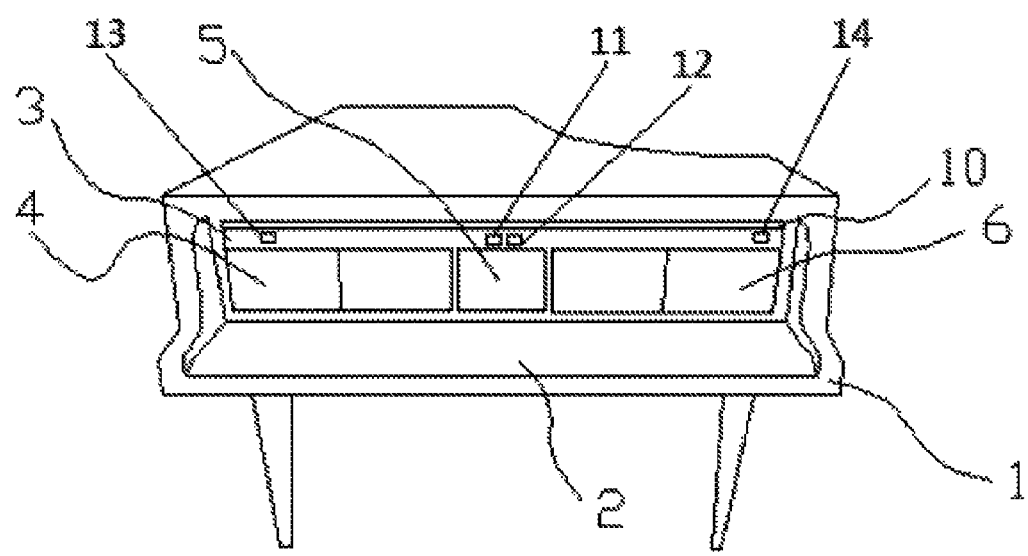
FIG. 2 is a structural schematic view of a piano of the present invention.
Figure 3:
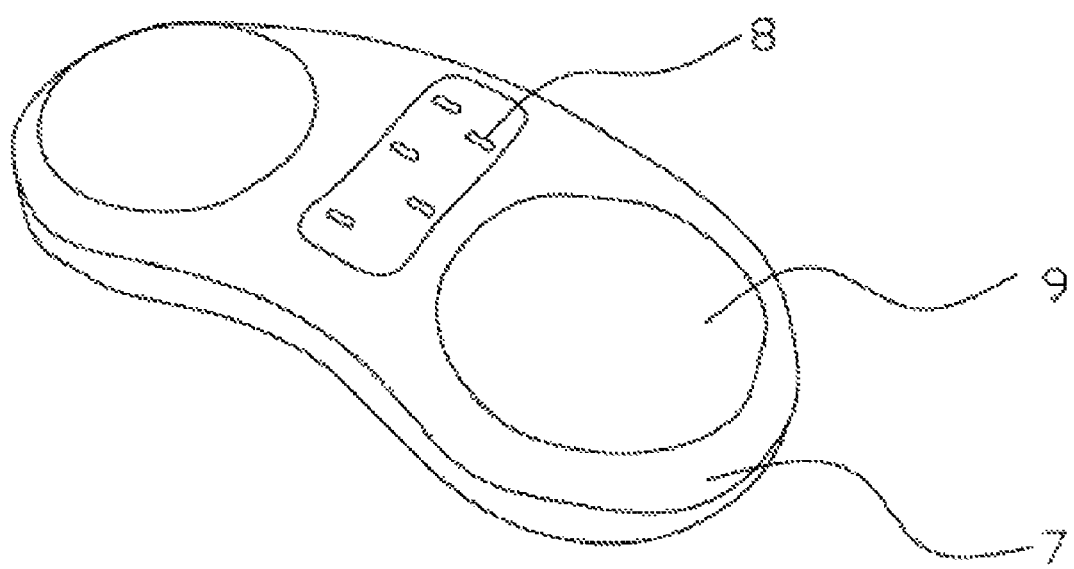
FIG. 3 is a structural schematic view of hand drums of the present invention.

The present invention will be further described below in conjunction with the drawings and the particular embodiments:

With reference to FIG. 1 to FIG. 3, the present invention provides a piano learning guidance system, comprising a piano 1 and hand drums, wherein the piano 1 is electrically connected to the hand drums, the piano 1 controls electric devices of the hand drums, and two hand drums are provided in the present invention. The mechanical structure of the piano 1 is approximately the same as a common piano in the market, having keys 2 and a fallboard 3. The piano 1 of the present invention is an electronic piano, which further comprises a control module 11, a storage module 12, a first LCD display screen 4, a second LCD display screen 5, a third LCD display screen 6, a key recording microphone 13 and first LED light bars. A plurality of first LED light bars are provided and in one-to-one correspondence to the keys of the piano. The first LCD display screen 4, the second LCD display screen 5 and the third LCD display screen 6 of the present invention can be arranged on the inner surface of the fallboard 3, and when the piano 1 is used, the fallboard 3 is opened, such that the inner surface of the fallboard 3 faces a user who is playing, and the user conveniently views data or pictures displayed on the first LCD display screen 4, the second LCD display screen 5 and the third LCD display screen 6.

The first LCD display screen 4 and the third LCD display screen 6 of the present invention are devices which actually have the same function, and respectively correspond to different users; for example, the first LCD display screen 4 corresponds to a user A, whereas the third LCD display screen 6 corresponds to a user B, but the contents displayed on the two display screens can be completely identical; it is also possible for one display screen to display music notation and the other display screen to display a brightness position, which will be specifically described below.

The storage module 12 of the present invention is preferably an SD card for storing MIDI files, a user can select a piece of music via the second LCD display screen 5, and the control module 11 retrieves the corresponding MIDI file according to the piece of music selected by the user, and generates two dropping dot indication files or one dropping dot indication file and one music notation indication file or two music notation indication files by parsing.

The mounted position of the first LED light bar corresponds to the first LCD display screen 4 and the third LCD display screen 6, that is, the first LED light bar is arranged in a polygon frame which is formed by the first LCD display screen 4 and the third LCD display screen 6; however, the first LED light bar, the first LCD display screen 4 and the third LCD display screen 6 are separate devices. Each first LED light bar is formed by a plurality of first LEDs which are successively arranged at equal intervals from top to bottom; the first LED light bar is used to instruct a user to press the corresponding key 2; the storage module 12, the first LCD display screen 4, the second LCD display screen 5, the third LCD display screen 6 and the key recording microphone 13 are all electrically connected to the control module 11. The key recording microphone 13 is used to collect piano audio when the user presses the key 2.

Each hand drum 7 comprises a second LED light bar 8 and a pressure sensor, the second LED light bar 8 is formed by a plurality of second LEDs which are successively arranged at equal intervals from top to bottom, and the second LED light bar is used to instruct the user to beat the hand drum; the pressure sensor is used to collect hand drum audio when the user beats the hand drum; and the second LED light bar and the pressure sensor are electrically connected to the control module 11.

The control module 11 controls lit positions of the first LEDs and the second LEDs from top to bottom according to the dropping dot indication file, and controls the first LCD display screen and/or the third LCD display screen to display the corresponding music notation according to the music notation indication file so as to instruct the user to press the key 2 or beat the hand drum, i.e. when the last one of the first LEDs or the last one of the second LEDs is lit up, the user presses the key 2 or beats the hand drum; and the time at which the hand drum audio is received from the two pressure sensors are respectively compared with the MIDI file, or the piano audio received from the piano recording microphone 13 is compared with the MIDI file.

Specifically, the MIDI file has a plurality of corresponding audio tracks, and two dropping dot indication files can be generated according to the audio track by parsing. According to the dropping dot indication file, the number of first LEDs of each first LED light bar, the number of second LEDs of each second LED light bar 7, a distance between first LEDs, a distance between second LEDs and a pre-set preparation time, the control module 11 obtains the lit positions corresponding to the first LEDs and the second LEDs from top to bottom, respectively, i.e. controlling which of the first LEDs to light up and which of the second LEDs to light up at which specific time according to the dropping dot indication file.

For example, with regard to the two hand drums, one is hand drum A and the other is hand drum B; the user A uses the hand drum A and the user B uses the hand drum B, and during instructive practices, the control module 11 in the piano controls the second LEDs of the hand drum A and the hand drum B to synchronously light up, respectively instructing the user A and the user B to beat the hand drums, and the lit time points as well as the positions of the corresponding particulars of the hand drum A and the hand drum B are completely identical. When the user A and the user B beat the hand drum, generating a hand drum audio A and a hand drum audio B respectively, the hand drum audio A and the hand drum audio B are respectively compared with the MIDI file to obtain an accuracy rate of the user A and an accuracy rate of the user B, respectively, and the accuracy rate of the user A and the accuracy rate of the user B are compared to thereby obtain a synchronization rate between the user A and the user B, for example, the continuous accuracy rate of the user A is 100%, and the continuous accuracy rate of the user B is 100%, then the synchronization rate between the user A and the user B is 100%. The two persons must beat correctly at the same time, in order to raise the synchronization rate, and it can be configured to raise the synchronization rate to 100% only if correct beating lasts for ten seconds or more. An accuracy rate of 100% means correct beating. The synchronization rate is finally displayed on the second LCD display screen 5.

According to the above-mentioned settings, musical instrument guidance functions can be achieved for the user A and the user B at the same time, and for a beginner who has weak sense of rhythm, it can be enhanced by means of beating practices on the hand drum.

Another usage method consists in that: a user A and a user B both play the piano, the user A corresponds to the first LCD display screen 4, the user B corresponds to the third LCD display screen 6; and when playing, the control module 11 can generate two dropping dot indication files by parsing; it needs to point out herein that, instead of the first LCD display screen 4 corresponding to one dropping dot indication file and the third LCD display screen 6 corresponding to the other dropping dot indication file, the two dropping dot indication files herein correspond to left and right positions on the same LCD display screen and respectively instruct the left hands and the right hands of the user A and the user B to press the keys since it is generally understood that two hands are needed for playing piano.

When the piano is played, the control module 11 can also generate one music notation indication file and one dropping dot indication file according to the MIDI file by parsing; for example, the first LCD display screen 4 corresponds to the music notation indication file, and the third LCD display screen 6 corresponds to the dropping dot indication file, that is, the user A plays according to the music notation displayed on the first LCD display screen 4, and the user B plays according to the lit position displayed on the third LCD display screen 6; the piano audio played by the user A and the piano audio played by the user B are respectively compared with the MIDI file to obtain an accuracy rate of the user A and an accuracy rate of the user B, and then the synchronization rate between the user A and the user B are computed. The synchronization rate increases only when the two persons play correctly at the same time. The two users may change positions for practices. When the synchronization rate is 100% and lasts for a period of time, the next stage can be initiated, that is, the two users both play according to the music notation, and at this time, the control module 11 controls the first LCD display screen 4 and the third LCD display screen 6 to both display the music notation. When the first LCD display screen 4 shows music notation and the third LCD display screen 6 shows a light indication, the information shown thereby is synchronous and merely differs in presentations.

Certainly, when the piano is used to guide the training, the user A and the user B can also operate and exercise corresponding to the music notation indication file. This is the next stage for the stage where one user corresponds to the music notation whereas the other user corresponds to the light. With regard to music notation play practice, a dropping dot file can also be generated by parsing so as to enable the user to know more about the playing progress by marking in bold or lighting the position corresponding to the place of the music notation where the user needs to play.

Preferably, the hand drum 7 comprises two beat portions 9, two second LED light bars 8 are provided, the second LED light bars 8 are in one-to-one correspondence to the beat portions 9, and the second LED light bar 8 is used to instruct the user to beat the hand drum at the corresponding beat portion 9; and said control module is used to control lit positions of the second LEDs of one of the second LED light bars 8 from top to bottom according to one of the dropping dot indication files, and to control lit positions of the second LEDs of the other second LED light bar 8 from top to bottom according to the other dropping dot indication file.

One of the two beat portions 9 is a left beat portion, and the other is a right beat portion; one of the dropping dot indication files corresponds to the left one, and the other corresponds to the right one. It can be understood that the left hand of the user beats the left beat portion according to the light indication of the second LED light bar 8 corresponding to the left beat portion, and the right hand beats the right beat portion according to the light indication of the second LED light bar 8 corresponding to the right beat portion. Generally speaking, piano music is edited according to the keys 2 which need to be played by left and right hands, and when the left hand needs to play two keys in the piano music, the hand drum needs to be beaten twice, and so on. Performing the practice of the sense of rhythm with the hand drum may reduce the playing difficulty in subsequently practices with the keys 2 of the piano, increase the accuracy rate and boost confidences. The position of the beat portion 9 corresponds to the mounted position of the pressure sensor, that is, the pressure sensor can be mounted in the region of the beat portion 9 so as to better sense the beats of the user.

The present invention is directed to two trainees at the same time; the first LCD display screen 4 corresponds to one user, and the third LCD display screen 6 corresponds to the other user; one user needs to use the left hand and the right hand to play, wherein the first LCD display screen 4 can be divided into left and right regions for dropping dots of two different dropping dot indication files to instruct the user to press the keys; the two regions can be understood as a left LCD display screen and a right LCD display screen of the first LCD display screen 4, and can also instruct the left hand and the right hand of the user to press the keys according to different light colors displayed according to the two different dropping dot indication files. The third LCD display screen 6 works similarly. However, if correspondingly, the control module generate a music notation indication file according to the MIDI file by parsing, then the music notation indication file can be identical on the left and right screens of the first LCD display screen 4, and similarly, in the case of the music notation indication file, left and right screens of the third LCD display screen 6 are the same.

The left LCD display screen of one of the first LCD display screens 4 corresponds to a left hand key region of the user A, and the right LCD display screen corresponds to a right hand key region of the user A. Similarly, the other LCD display screen corresponds to the user B, the first left LCD display screen corresponds to the left hand key region of the user B, and the first right LCD display screen corresponds to the right hand key region of the user B. The same principle applies for the third LCD display screen 6.

One of the two dropping dot indication files corresponds to the left LCD display screen, and the other corresponds to the right LCD display screen, or the two dropping dot indication files respectively correspond to the light of different colors so as to instruct the user A and the user B to press the corresponding key with the left hand or the right hand. When the user plays the piano, the comparison process thereof is the same to that of the hand drum. Similarly, the two persons must play correctly, in order to increase the synchronization rate, and if correct playing lasts for ten seconds or more, the synchronization rate increases to 100%. After maintaining the synchronization rate at 100% for a period of time, the tutorial may be finished.

In the present invention, the number of first LEDs is preferably but not limited to 16. The number of the first LEDs and the number of the second LEDs are set according to actual situations.

In addition, the piano learning guidance system further comprises a loudspeaker 14, the loudspeaker 14 is electrically connected to the control module 11, and the control module 11 is used to process and then output the hand drum audio from the pressure sensor or the read MIDI file in the storage module to the loudspeaker 14 for play. The hand drum can emit a sound when the user beats the beat portion, and can also play the sound by the loudspeaker. A plurality of audio tracks can be generated by parsing the MIDI file, among which one audio track can be taken as a main note for use as the dropping dot indication file or the music notation indication file, while the other audio tracks can be output via the loudspeaker as accompaniments.

The end of the piano which is away from the keys 2 when the fallboard 3 is opened is provided with a ridge 10 which is perpendicular to the first LCD display screen 4, the second LCD display screen 5 and the third LCD display screen 6, respectively, the ridge 10 is located above the keys 2, the ridge 10 is provided with laser transmitters in one-to-one correspondence to the keys 2, the laser transmitters are connected to the control module 11, and said control module is used to control the working of the corresponding laser transmitter according to the MIDI file so as to instruct the user to press the key 2 corresponding to the laser transmitter. Generally, 88 keys 2 are provided, and the number of the laser transmitters is also 88, such that light emitted by the laser transmitter just projects on the corresponding key 2 so as to visually instruct the user. In FIG. 2, viewing from bottom to top until the ridge, there is the mounted position of the laser transmitter.

With the setting of the present invention, a user can learn to play piano music in an easy and pleasant manner, which helps the trainee to master playing techniques, rhythms, etc. of the piano music as soon as possible, and strengthens the cultivation of interests.

For a person skilled in the art, a variety of other corresponding modifications and variations can be made according to the technical solutions and conceptions described above, and all the modifications and variations shall fall within the scope of protection of the claims of the present invention.

What is claimed is:

1. A piano learning guidance system, comprising a piano and two hand drums, wherein said piano comprises a control module, a storage module, a first LCD display screen, a second LCD display screen, a third LCD display screen, a key recording microphone and a plurality of first LED light bars in one-to-one correspondence to keys of the piano, and each first LED light bar is formed by a plurality of first LEDs which are successively arranged at equal intervals from top to bottom; the first LED light bar is used to instruct a user to press the corresponding key; the storage module, the first LED light bar, the first LCD display screen, the second LCD display screen, the third LCD display screen and the key recording microphone are all electrically connected to the control module; the key recording microphone is used to collect piano audio when the user presses the key;

each hand drum comprises a second LED light bar and a pressure sensor, the second LED light bar is formed by a plurality of second LEDs which are successively arranged at equal intervals from top to bottom, and the second LED light bar is used to instruct the user to beat the hand drum; the pressure sensor is used to collect hand drum signal when the user beats the hand drum; the second LED light bar and the pressure sensor are electrically connected to the control module;

the control module is used to read a MIDI file in the storage module, generate two dropping dot indication files or one dropping dot indication file and one music notation indication file or two music notation indication files by parsing the MIDI file, control lit positions of the first LEDs and the second LEDs from top to bottom according to the dropping dot indication file, control the first LCD display screen and/or the third LCD display screen to display the corresponding music notation according to the music notation indication file so as to instruct the user to press the key or beat the hand drum, and compare respectively the hand drum audio received from two pressure sensors with the MIDI file, or the piano audio received from the piano recording microphone with the MIDI file.

2. The piano learning guidance system of claim 1, wherein 16 first LEDs are provided.

3. The piano learning guidance system of claim 1, wherein said storage module is an SD card.

4. The piano learning guidance system of claim 1, wherein a loudspeaker is further provided, the loudspeaker is electrically connected to the control module, and the control module is used to process and then output the hand drum audio from the pressure sensor or the read MIDI file in the storage module to the loudspeaker for play.

5. The piano learning guidance system of claim 1, wherein said hand drum comprises two beat portions, two second LED light bars are provided and in one-to-one correspondence to the beat portions, the second LED light bars are used to instruct the user to beat the hand drum at the corresponding beat portion; and said control module is used to control lit positions of the second LEDs of one of the second LED light bars from top to bottom according to one of the dropping dot indication files, and control lit positions of the second LEDs of the other second LED light bar from top to bottom according to the other dropping dot indication file.

6. The piano learning guidance system of claim 1, wherein the piano learning guidance system is attached to a piano's fallboard.

7. The piano learning guidance system of claim 1, wherein the piano learning guidance system is designed in the shape of a piano's fallboard and replaces the piano's fallboard when installed, the control module, the storage module, the first LCD display screen, the second LCD display screen, the third LCD display screen, the key recording microphone and the plurality of first LED light bars are all installed on the new fallboard.

8. The piano learning guidance system designed in the shape of a fallboard of claim 7, wherein the end of the fallboard which is away from the keys when the fallboard is opened is provided with a ridge which is perpendicular to the first LCD display screen, the second LCD display screen and the third LCD display screen, respectively, the ridge is provided with laser transmitters in one-to-one correspondence to the keys, the laser transmitters are connected to the control module, and said control module is used to control the working of the corresponding laser transmitter according to the MIDI file so as to instruct the user to press the key corresponding to the laser transmitter.

\* \* \* \* \*